(12) United States Patent
Klettke et al.

(10) Patent No.: US 7,947,757 B2
(45) Date of Patent: May 24, 2011

(54) SULFONIUM INITIATORS, PROCESS FOR PRODUCTION AND USE IN CATIONIC POLYMERIZABLE COMPOSITIONS

(75) Inventors: Thomas Klettke, Diessen (DE); Cornelia B. Fuehrer, Wertach (DE); Andrea Hailand, Mauerstetten (DE); Markus Mikulla, Andechs-Frieding (DE)

(73) Assignee: 3M Innovative Properties Company, St. Paul, MN (US)

( * ) Notice: Subject to any disclaimer, the term of this patent is extended or adjusted under 35 U.S.C. 154(b) by 573 days.

(21) Appl. No.: 11/997,192

(22) PCT Filed: Jul. 27, 2006

(86) PCT No.: PCT/US2006/029311
§ 371 (c)(1), (2), (4) Date: Jan. 29, 2008

(87) PCT Pub. No.: WO2007/016295
PCT Pub. Date: Feb. 8, 2007

(65) Prior Publication Data
US 2008/0200585 A1 Aug. 21, 2008

(30) Foreign Application Priority Data
Jul. 29, 2005 (EP) .................................... 05016531

(51) Int. Cl.
*A61K 6/10* (2006.01)
*A61C 9/00* (2006.01)
*C07C 381/12* (2006.01)

(52) U.S. Cl. ............. 523/109; 433/214; 568/26; 554/85
(58) Field of Classification Search .................. 523/109; 433/214; 554/85; 568/26
See application file for complete search history.

(56) References Cited

U.S. PATENT DOCUMENTS

| | | | |
|---|---|---|---|
| 3,453,242 A | 7/1969 | Schmitt et al. | |
| 4,167,618 A | 9/1979 | Schmitt et al. | |
| 4,250,053 A * | 2/1981 | Smith | 502/167 |
| 4,390,644 A * | 6/1983 | Clarke et al. | 521/121 |
| 4,867,790 A | 9/1989 | Jochum et al. | |
| 5,286,105 A | 2/1994 | Herold et al. | |
| 5,569,691 A | 10/1996 | Guggenberger et al. | |
| 6,127,449 A | 10/2000 | Bissinger et al. | |
| 6,383,279 B1 | 5/2002 | Eckhardt et al. | |
| 6,894,144 B1 | 5/2005 | Zech et al. | |
| 6,906,117 B2 | 6/2005 | Nowak et al. | |
| 2003/0153726 A1 | 8/2003 | Eckhardt et al. | |
| 2004/0014024 A1 | 1/2004 | Yayon et al. | |

FOREIGN PATENT DOCUMENTS

| | | |
|---|---|---|
| DE | 197 53 456 | 6/1999 |
| DE | 199 42 459 | 3/2001 |
| DE | 100 26 857 | 12/2001 |
| WO | WO 01/17483 | 3/2001 |

* cited by examiner

Primary Examiner — Tae H Yoon
(74) Attorney, Agent, or Firm — Pamela L. Stewart

(57) ABSTRACT

The invention relates to an initiator comprising at least one structural element characterized by the following formula (I) wherein $X^-$ is a non or low coordinating anion, R1, R2, R3, R4 are independently linear, cyclic or branched $C_1$-$C_{20}$ alkyl or alkylene groups, wherein one or more of the methylene groups contained in the alkyl or alkylene group can be substituted by —CO—, —CONH—, —CON(CH$_3$)—, —S— and/or —O—, and wherein R1, R2, R3 and/or R4 can act as a bridging element connecting two or more structural elements. The invention is also related to a process of producing the initiator and to a curable composition comprising the initiator, a process for producing the curable composition a kit comprising a cationically curable composition and the inventive initiator and the use of the initiator or the curable composition comprising the initiator for various applications, especially in the dental field.

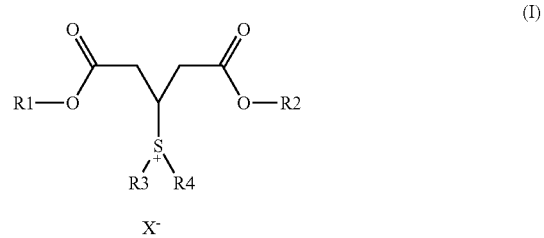

(I)

13 Claims, No Drawings

SULFONIUM INITIATORS, PROCESS FOR PRODUCTION AND USE IN CATIONIC POLYMERIZABLE COMPOSITIONS

CROSS REFERENCE TO RELATED APPLICATIONS

This application is a national stage filing under 35 U.S.C. 371 of PCT/US2006/029311, filed Jul. 27, 2006, which claims priority to EP Application No.05016531.5, filed Jul. 29, 2005, the disclosure of which is incorporated by reference in its entirety herein.

The invention relates to a new class of initiators, a process for producing them, a cationic curable composition containing them and the use of the initiator and the composition, e.g. in the dental field.

BACKGROUND OF THE INVENTION

Rubber elastic compositions containing aziridine compounds are know for a long time. Curing of these compositions is usually effected using specific catalysts.

In this respect U.S. Pat. No. 4,167,618 A1 describes a process for the polymerization of aziridine compounds. The polymerization process includes mixing an aziridine compound with an alkyl sulfonium salt initiator having at least one hydrogen atom and an electron attracting radical in the carbon atom of the alkyl group in β-position in regard to the sulphur atom.

WO 01/17483 A1 relates to elastomer materials based on N-alkyl aziridine compounds comprising a base constituent, which contains aziridine compounds, and comprising a catalyst constituent, which contains at least one acidically active compound, whereby both constituents are mixed before use. The elastomer materials are characterized in that one or more boric acid complexes are used as an acidically active compound of the catalyst constituent. The elastomer materials can be used as dental impression material, bite recording material, and duplicating material.

In DE 19 753 456 A1 a two-component cationically-curable aziridine polyether-based composition is described, comprising a catalyst component, including acid(s) and aziridine salt(s) of an acid, and a base component including a mixture of N-alkylaziridine polyol ethers and a cationic polymerization retarding agent(s).

US 2003/153726 A1 relates to catalyst components containing at least one Brönsted acid, water and at least one antacid-acting compound. The catalyst components can be used to initiate cure of an aziridino-group-containing material.

Depending on the intended use, in the dental field the materials usually have different viscosities (light body, medium body, heavy body). In view of the fact that sometimes relatively large amounts of conventional alkyl sulfonium salt initiators are needed to cure aziridine polyether-based compositions, the viscosity of the components of the composition may need to be adjusted to ensure adequate mixing and application of the mixed paste.

SUMMARY OF THE INVENTION

Thus, there is a need for a new initiator, which can be used for curing a cationically polymerizable composition.

It would be an advantage, if the new initiator can be manufactured in an easy and inexpensive manner.

It would be a further advantage, if adding the initiator to a paste allows adjustment of the rheology (e.g. viscosity) of this paste.

It has been found that one or more of the above mentioned objects can be achieved by providing an initiator as described in the text and claims below.

In one aspect, the invention provides an initiator comprising at least one structural element of the following formula I

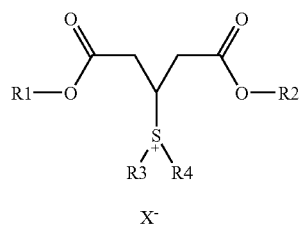

wherein
X⁻ is a non or low coordinating anion,
R1, R2, R3 and R4 are independently linear, cyclic or branched $C_1$-$C_{20}$ alkyl or alkylene groups, wherein one or more of the methylene groups may be substituted by —CO—, —CONH—, —CON($CH_3$)—, —S— and/or —O—,
and wherein R1, R2, R3 and/or R4 can act as a bridging element, connecting two or more structural elements.

Subject to the question whether bridging elements are present or not, the initiator can be characterized as monomer, dimer, trimer, higher oligomer or polymer with one, two, three, four or more sulfonium groups.

In another aspect, this invention provides a process of producing the initiator, curable compositions comprising the initiator, a process for producing the curable compositions, a kit comprising a cationically curable composition and the inventive initiator and the use of the initiator or the curable composition comprising the initiator for various applications, especially in the dental field.

The terms "comprises" and variations thereof do not have a limiting meaning where these terms appear in the description and claims.

As used herein, "a," "an," "the," "at least one," and "one or more" are used interchangeably. Thus, for example, a dental composition that comprises "a" oxirane-containing monomer can be interpreted to mean that the dental composition includes "one or more" oxirane-containing monomers. Similarly, a composition comprising "a" filler can be interpreted to mean that the composition includes "one or more" types of fillers.

Also herein, the recitations of numerical ranges by endpoints include all numbers subsumed within that range (e.g., 1 to 5 includes 1, 1.5, 2, 2.75, 3, 3.80, 4, 5, etc.).

The term "non or low coordinating group" within the meaning of the invention are anions of strong acids, preferably acids having a pKs value below about 2. Respective examples are $BF_4^-$, $CF_3SO_3^-$, $SbF_6^-$, $AsF_6^-$ or 2,5-di-chloro-benzolsulfonate, but even other low coordinating anions can be used.

The term "bridging element" within the meaning of the invention is defined as a chemical group being able to connect two or more of the aforementioned structural elements comprising at least one sulfonium group.

The term "sulfonium equivalent weight" or ""Eq" within the meaning of the invention is calculated as molecular mass of the initiator divided by the number of sulfonium groups present in the initiator. In regard to oligomers or polymers the calculation of the sulfonium equivalent weight is based the Eq of one repeating unit.

The term "dental materials" comprises impression materials, such as precision impression materials, situation impression materials, bite registration materials, duplicating materials (applicable for the duplication of master models, e.g. for all-ceramic restorations requiring a refractory investment model and when inlays, onlays, cantilevers and other precision attachments are being fabricated) and modelling materials (applicable for e.g. reconstructing the gingival, producing crowns and bridges). Duplicating and modelling materials are commercially available e.g. from 3M ESPE AG under the trademarks Reprogum™ or Vestogum™.

The term "cationically polymerizable compound" within the meaning of the invention is defined as a compound which can be polymerised using an initiator containing or being able to produce cations.

The term "glutaconate" within the meaning of the invention comprise the free glutaconic acid, the partly or de-protonated form of the glutaconic acid (salt of the acid) or an ester (mono-or di-ester) thereof or combinations of glutaconic acid, partly or de-protonated species or esters.

DETAILED DESCRIPTION OF ILLUSTRATIVE EMBODIMENTS

R1, R2, R3 and R4 are independently linear, cyclic or branched $C_1$-$C_{20}$ alkyl or alkylene groups, wherein one or more of the methylene groups may be substituted by —CO—, —CONH—, —CON($CH_3$)—, —S— and/or —O—.

Representative examples of R1 or R2 of the formula of the inventive initiators are methyl, ethyl, n-propyl, 2-propyl, n-butyl, sec-butyl, tert.-butyl, n-pentyl, n-hexyl, n-heptyl, n-octyl groups and the like. One or more methylene groups contained in the alkyl or alkylene groups of R1 and R2 (e.g. 2, 3, 4 5 or 6) may be substituted by —CO—, —CONH—, —CON($CH_3$)—, —S— and/or —O—. In preferred examples of the initiator, R1 and R2 are the same and are selected from $C_4$-$C_8$ alkyl groups like n-butyl, n-pentyl, n-hexyl, n-heptyl or n-octyl groups.

Preferred R3 groups may be a substituted or not substituted linear or branched alkyl groups. Representative examples of preferred R3 groups are methyl, ethyl, n-propyl, 2-propyl, n-butyl, sec-butyl, tert-butyl, n-pentyl, n-hexyl, n-heptyl, n-octyl, and other alkylgroups up to about 20 carbon atoms.

Preferred R4 groups may be substituted or unsubstituted linear or branched alkyl groups. Examples of preferred R4 groups are alkyl group like octyl, nonyl, decyl, undecyl and dodecyl. One ore more of the methylene groups (e.g. 2, 3, 4 5 or 6) of this alkyl chain may be substituted by —CO—, —CONH—, —CON($CH_3$)— —S— and/or —O—. Some specific examples of preferred R4 groups are $CH_2CH_2COOCH_2CH_2CH_2CH_3$, $CH_2CH_2COO$-isooclylester, $CH_2COOCH_2CH_2CH_2CH_3$.

Bridging elements can be introduced by reacting the carbonic acid ester group(s) of a precursor of the inventive initiator with a diol containing e.g. 2 to 20 carbon atoms in a polycondensation reaction. By doing so, a polycondensation product can be provided containing as repeating unit the structural element comprising at least one sulfonium group as defined in the formula above. This kind of modification can be used e.g. for adjusting the molecular weight of the initiator and by doing so even the viscosity of a composition containing the initiator can be adjusted.

Further bridging elements can be introduced by reacting the carbonic acid ester group(s) of the precursor of the inventive initiator with tri-, tetra- or higher functional polyols. In these cases an excess of the precursor should be used to avoid a crosslinking reaction.

As mentioned above R1, R2, R3 and R4 can independently function as a bridging element to another structural element comprising a sulfonium group. E.g. a moiety like —$(CH_2)_8$—, —$(CH_2)_6$— or —$(CH_2)_4$— may connect two structures containing a sulfonium group. For oligomers or polymers end groups like methyl esters or ethyl esters are preferred, but even higher ester groups up to 20 C-atoms can be advantageous. However, it is also possible to introduce other bridging groups e.g. using dithiols for the synthesis.

Preferred embodiments of the initiator can be characterized as polycondensable if they comprise reactive groups able to undergo polycondensation reactions resulting in an increase of the molecular weight such as trans-esterification reactions Typically, the initiator will have a molecular weight (MW) in the range of about 300 to about 25,000 g/mol, preferably, in the range of about 400 to about 20,000 g/mol, or more preferably, in the range of about 500 to about 10,000 g/mol, wherein the molecular weight (MW) of oligomers and polymers is the number average molecular weight (Mn)

Typical sulfonium equivalent weights (Eq) for the initiator can be in the range of about 300 to about 800 g/mol, and preferably in the range of about 350 to about 750.

The initiators are typically oily or solid at ambient conditions (23° C., 1013 mbar), oily initiators are preferred. If the initiator is a solid substance, the melting point is usually below about 50° C.

The initiators can be dissolved in a variety of different solvents. Solvents having no bitter taste are preferred. Examples of suitable solvents include, e.g., citrates such as acetyl tri-n-butyl citrate (CAS 77-90-7), acetyl tri-n-hexyl citrate (CAS 2481792-3) or acetyl tri-2-ethylhexyl citrate (CAS 144-15-0). Especially preferred are the last two solvents because they can generally dissolve the inventive initiators at ambient conditions and they do not taste bitter.

Respective examples of initiators according to the invention are given below:

EXAMPLE 1

Initiator-1

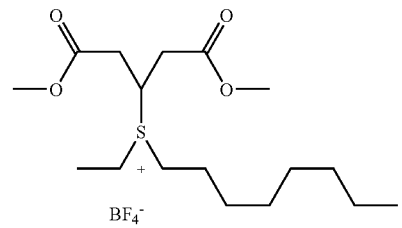

Molecular weight (MW)=420.32 g; Equivalent Eq=420.32 g

EXAMPLE 2

Initiator-2

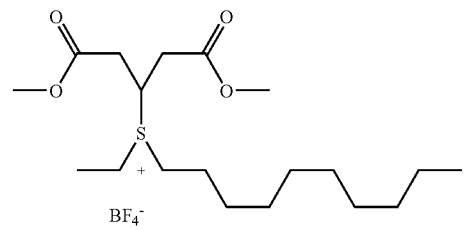

MW=448.37 g; Eq=448.37 g

EXAMPLE 3
Initiator-3
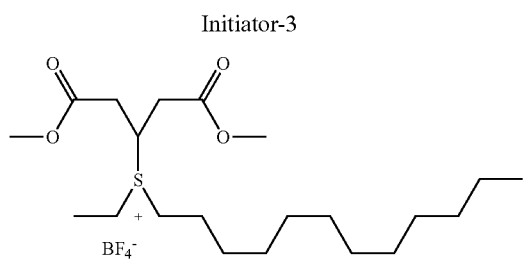
MW=476.43 g; Eq=476.43 g
EXAMPLE 4
Initiator-4
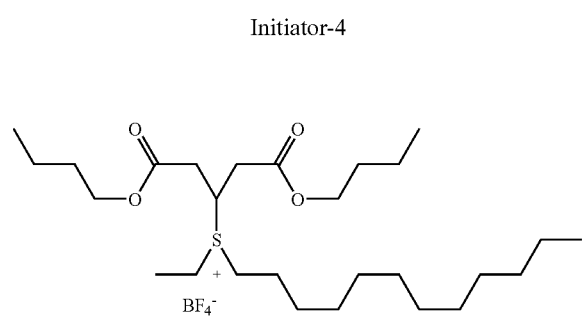
MW=560.59 g; Eq=560.59 g
EXAMPLES 5
Initiator-5
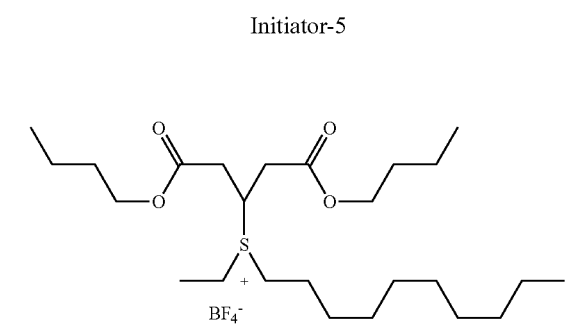
MW=532.53 g; Eq=532.53 g
EXAMPLE 6
Initiator-6
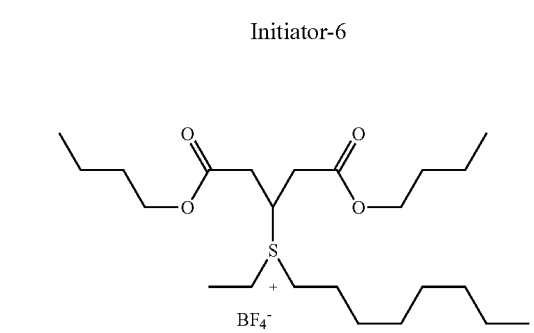
MW=504.48 g; Eq=504.48 g
EXAMPLE 7
Initiator-7
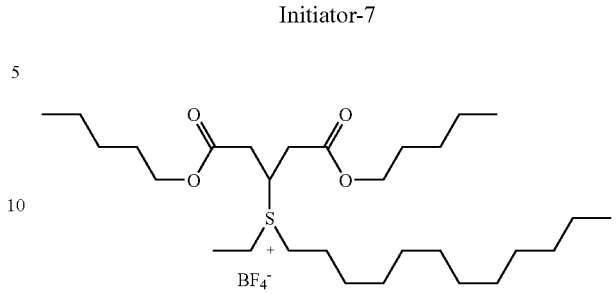
MW=588.65 g; Eq=588.65 g
EXAMPLE 8
Initiator-8
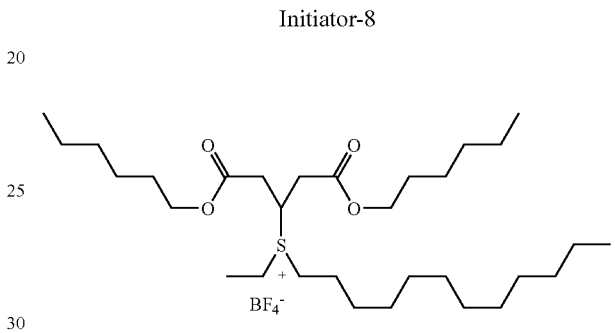
MW=616.70 g; Eq=616.70 g
EXAMPLE 9
Initiator-9
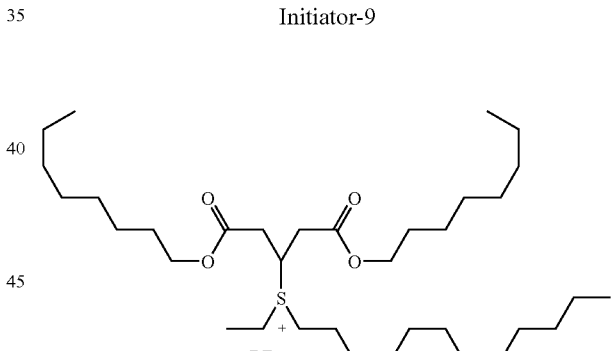
MW=672.81 g; Eq=672.81 g
EXAMPLE 10
Initiator-10
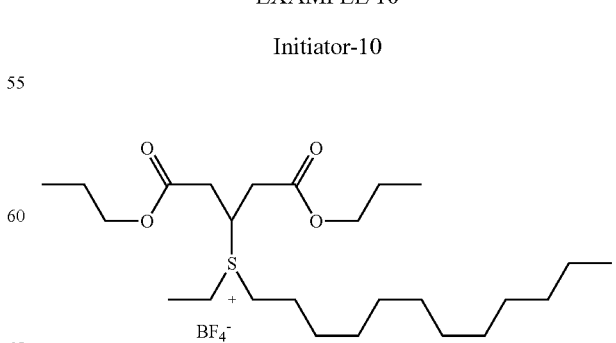
MW=532.54 g; Eq=532.54 g

EXAMPLE 11
Initiator-11
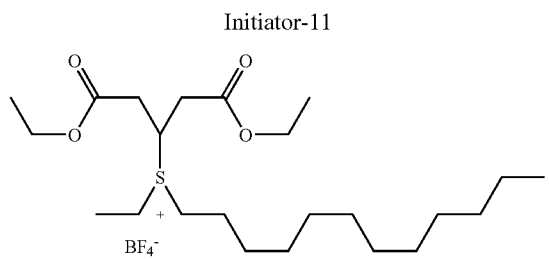
MW=504.48 g; Eq=504.48 g
EXAMPLE 12
Initiator-12
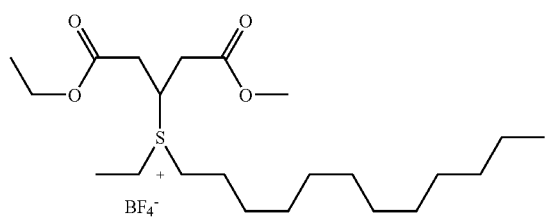
MW=490.46 g; Eq=490.46 g
EXAMPLE 13
Initiator-13
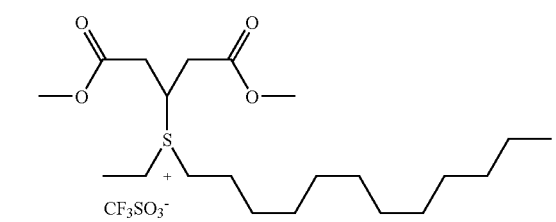
MW=538.68 g; Eq=538.68 g
EXAMPLE 14
Initiator-14
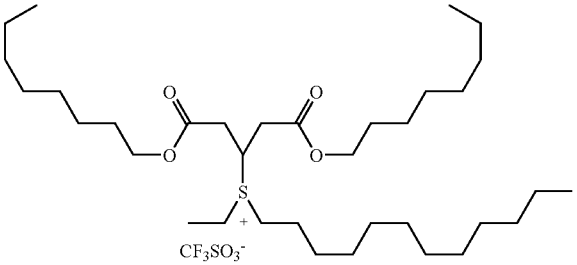
MW=735.06 g; Eq=735.06 g
EXAMPLE 15
Initiator-15
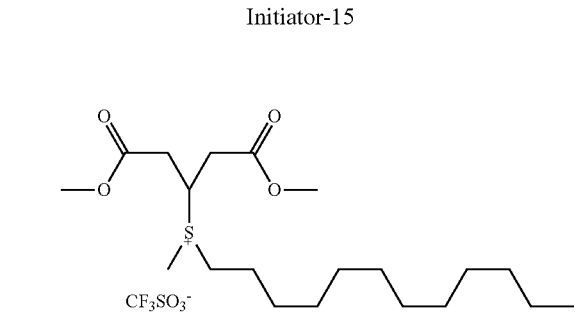
MW=524.66 g; Eq=524.66 g
EXAMPLE 16
Initiator-16
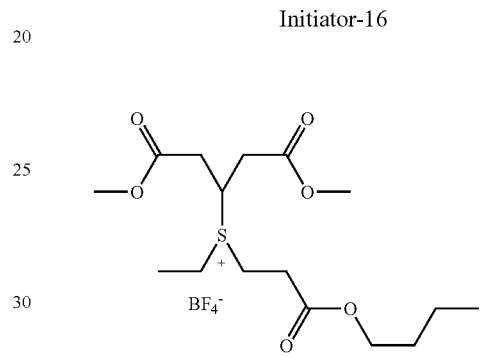
MW=436.27 g; Eq=436.27 g
EXAMPLE 17
Initiator-17
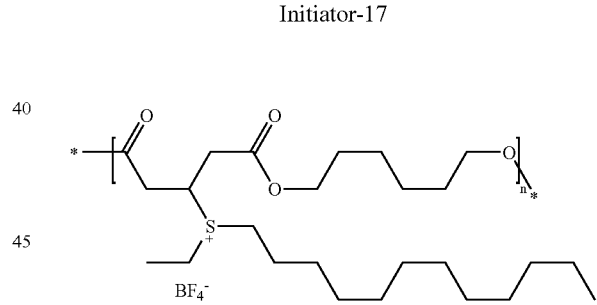
(MW≦20.000 g or <10.000 g) n=1, 2, 3, . . .
Eq=530.32 g (MW repetition unit=530.32 g)
EXAMPLE 18
Initiator-18
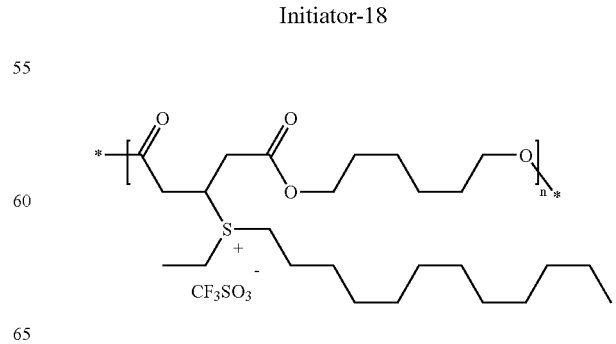
(MW≦20.000 g or <10.000 g) n=1, 2, 3, . . .
Eq=603.59 g (MW repetition unit=603.59 g)

EXAMPLE 19

Initiator-19

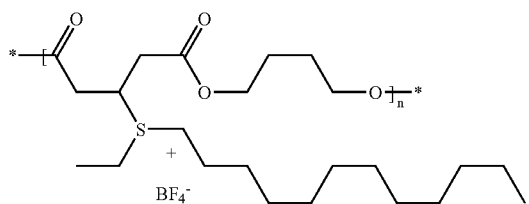

(MW≦20.000 g or <10.000 g) n=1, 2, 3, . . .
Eq=502.46 g (MW repetition unit=502.46 g)

EXAMPLE 20

Initiator-20

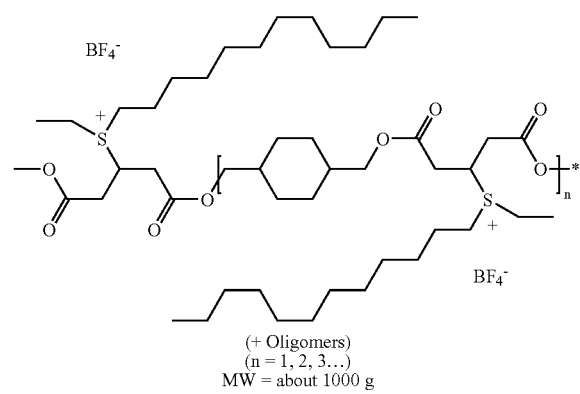

(+ Oligomers)
(n = 1, 2, 3...)
MW = about 1000 g

MW=1032.98 g (contains molecules with n=1 as main substance+Oligomers); Eq=516.49 g

EXAMPLE 21

Initiator-21

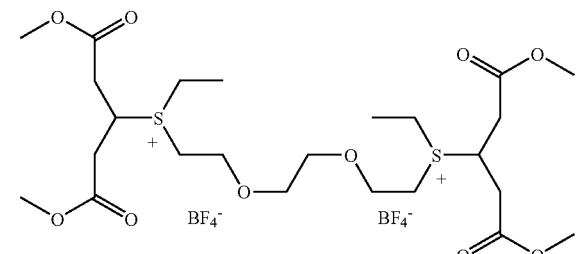

MW=730.35 g; Eq=365.17 g

EXAMPLE 22

Initiator-22

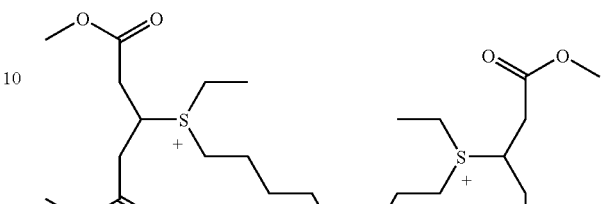

MW=726.40 g; Eq=363.20 g

EXAMPLE 23

Initiator-23

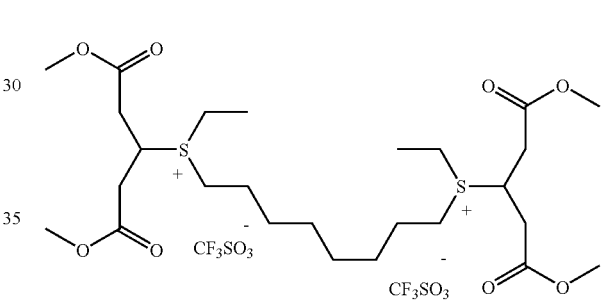

MW=850.92 g; Eq=425.46 g

EXAMPLE 24

Initiator-24

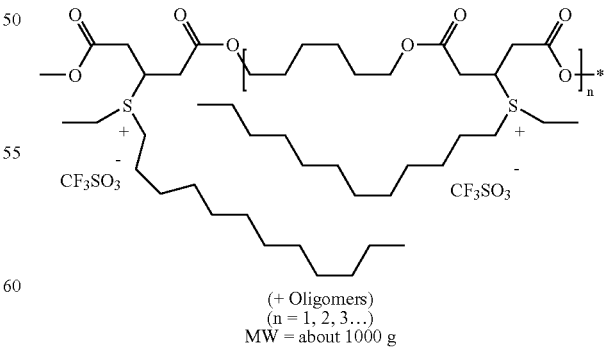

(+ Oligomers)
(n = 1, 2, 3...)
MW = about 1000 g

MW=1006.94 g (contains molecules with n=1 as main substance+Oligomers), Eq=503.47 g

EXAMPLE 25

Initiator-25

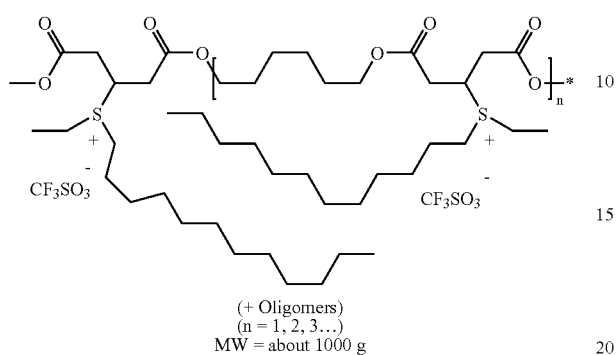

(+ Oligomers)
(n = 1, 2, 3 ...)
MW = about 1000 g

Eq=565.73 g; MW=1131.46 g (contains molecules with n=1 as main substance+Oligomers)

The invention also provides a process for producing an initiator or the inventive initiator comprising the steps of
  a) reacting a glutaconate, preferably a glutaconic acid ester with a thiol compound to obtain a sulfide compound,
  b) optionally reacting the sulfide compound of step a) with an alcohol in a trans-esterification reaction or polycondensation reaction,
  c) reacting the sulfide compound of step a) or b) with an alkylating reagent to obtain a sulfonium compound.

Another process for producing an initiator or the inventive initiator comprises the steps of
  a) reacting glutaconic acid with an alcohol in an esterification reaction or polycondensation reaction to obtain a glutaconate
  b) reacting the glutaconate of step a) with a thiol to obtain a sulphide compound,
  c) reacting the sulphide compound of step b) with an alkylating reagent to obtain a sulfonium compound.

Thiol compounds which can be used comprise alkyl thiols and alkyl di-thiols, wherein the alkyl group is a linear, cyclic or branched $C_1$-$C_{20}$ alkyl or alkylene group, wherein one or more of the methylene groups may be substituted by —CO—, —CONH—, —CON(CH$_3$)—, —S— and/or —O— (cf. definition of R4 in the formula I above). Representative examples of useful thiols or di-thiols are: n-octyl thiol, n-decyl thiol, n-dodecyl thiol, HS—(CH$_2$)$_8$—SH and HS—CH$_2$CH$_2$—O—CH$_2$CH$_2$—O—CH$_2$CH$_2$—SH.

Alkylating reagents which can be used are reagent being able to alkylate thio ethers at the S-atom to form sulfonium compounds. Representative examples of alkylating reagents are triethyloxonium tetrafluoroborate, ethyltriflate or methyltriflate.

With the processes described above a variety of initiators can be produced having different viscosities but a similar reactivity towards cationically polymerizable compositions. Moreover, using the above mentioned processes, the sulfonium equivalent weight of the initiator can be adjusted to a certain range.

In a preferred embodiment, the inventive initiator can be produced using e.g. the following described procedure:

Step One: Preparation of the Sulfide

Glutaconate comprising glutaconic ester according to formula B

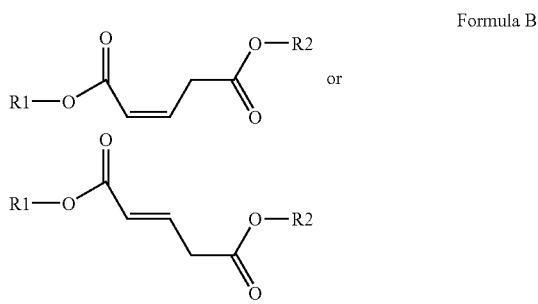

Formula B wherein $R_1$, $R_2$ independently from each other are a $C_1$-$C_{20}$, preferred a $C_1$-$C_4$ alkyl group such as methyl, ethyl, propyl or butyl
is reacted with a thiol or dithiol in the presence of a basic catalyst. Examples of useful basic catalysts include, e.g., sodium- or potassium methylate, -ethylate, -propylate or -butylate. The reaction may be performed in the presence or absence of a solvent. Examples of useful solvents include, e.g., cyclohexane, benzene or toluene. Reaction in solution is preferred but not mandatory.

The catalyst can be added to the mixture of thiol and ester, however, the mixture of ester and thiol can also be added to the catalyst. It is also possible to add the thiol and ester in parallel to the catalyst, using e.g. two dropping funnels. It is even possible to add the thiol to the catalyst (or the catalyst to the thiol) first. Afterwards, the ester is added. Typically, addition can be done at about 20° C. to about 50° C. and it is usually completed within a few hours (e.g. about 1 to about 5 h). Applying higher temperatures may be possible, but it is not always recommended. The catalyst can be removed, for example, by washing the reaction mixture with diluted acid (such as sulfuric acid or hydrochloric acid) and then water. After removal of the solvent, the sulfide can be obtained.

Step Two (Optional): Transesterification or Polycondensation

The sulfide obtained from step one can be mixed with about two moles of an alcohol (or about one mole of a diol), an acid or base as catalyst, and optionally a solvent.

Representative examples of useful alcohols include: 1-pentanol, 1-hexanol, 1-octanol, and cyclohexanol Representative examples of acidic or basic catalysts include: p-toluenesulfonic acid, sulfuric acid, titanium-tetra isopropylate, potassium- and sodium tert.-butylate.

Representative examples of useful solvents include: toluene, benzene or cyclohexane.

The mixture usually is heated to about 60-150° C. for several hours (e.g., about 2 to about 10 h) or even several days (2-7 days). During the reaction, a low boiling alcohol is formed (e.g. an alcohol having a boiling point below about 120-100° C.). To complete the reaction, the alcohol preferably is removed by distillation. After completion of the reaction, the catalyst can be removed, for example, by extraction with water or by treatment with $Al_2O_3$. (e.g. available from MP Biomedicals GmbH, 37269 Eschwege, Germany). If the reaction was carried out in a solvent, the solvent may be removed by distillation.

Step Three: Reacting the Sulfide Obtained in Step a) or b) with an Alkylating Reagent After setting a flask under inert gas atmosphere such as nitrogen or argon atmosphere an excess of alkylating reagent, for example, triethyloxonium tetrafluoroborate, ethyltriflate or methyltriflate, is placed into the flask. A solvent is optionally added and the mixture is stirred to form a slurry or solution.

Representative examples of solvents that can be used are: toluene, benzene or dichloromethane.

While stirring, the sulfide obtained from step a), or optional step b), can optionally be dissolved in the same solvent (e.g., cyclohexane, benzene or toluene.) added over a typical time frame of several hours (e.g. about 2 to about 10 h) preferably at about 10-60° C. After addition is complete, the reaction mixture may be stirred, preferably for additional about 1-8 days, and preferably at about 10-60° C.

A reaction without any solvent is also possible. Reaction in solution is preferred but not mandatory.

When the reaction is complete, the mixture is usually diluted with a solvent (e.g. toluene, benzene or dichloromethane) and extracted with water several times (e.g. about 2-5 times) until a pH of three or higher can be detected.

The solution is preferably dried, for example, by using sodium sulfate. After filtration, the solvent can be stripped off, e.g. using a rotary vacuum evaporator. The sulfonium compound is then obtained generally in the form of a liquid or a solid.

The inventive initiators can be used for curing a cationically polymerizable composition. Thus, the invention also provides a curable composition comprising at least one cationically polymerizable compound, preferably comprising at least two aziridine groups, as component (A) and at least one initiator as component (B). A mixture of different initiators can be used as well.

Generally, the cationically polymerizable compound is present generally in an amount of about 10-90 wt.-%, preferably in amount of about 10-80 wt.-%, and most preferably in amount of about 15-60 wt.-%, with respect to the weight of the whole composition.

Generally, the initiator is present in amount of about 1-30 wt.-%, or preferably, in amount of about 2-15 wt.-%, or most preferably, in amount of about 3-8 wt.-%, with respect to the weight of the whole composition.

Surprisingly, this class of initiators shows good curing kinetics, especially when used to cure dental impressioning materials.

Moreover, cured composition comprising the inventive initiator may also show improved linear dimensional stability (i.e., low shrinkage) compared to curable compositions known in the art cured using initiators containing common sulfonium salts.

Some of the curable compositions according to the invention also have non-biting taste, and the bitter taste is either reduced or non-existing. Improved taste can have the benefit of reducing the amount of saliva formed during a dental impression process which makes the process more pleasant for the patient and helps maintain accuracy of the dental impression.

Sometimes adjustment of the viscosity of the composition is needed, especially if compositions for different indications have to be provided. In the dental field there is often a need for formulations having different viscosities. These formulations are usually classified as light body, medium body or heavy body materials indicating an increase in viscosity.

Adjustment of the viscosity can be achieved e.g. increasing or reducing the amount of fillers or varying the molecular weight of the components of the composition. However, this can sometimes be a cumbersome undertaking as other physical properties of the composition (e.g. curing behaviour) are affected, too.

In this regard, using the inventive initiator can provide some advantages, especially in regard to dental impressioning materials. The amount of initiator used for curing these compositions can be quite high (e.g. up to about 30% by weight). Thus, a considerable part of the so-called catalyst paste can be comprised by the initiator contributing to the viscosity of the paste.

As described above due to the presence of two carbon ester groups in the initiator, these groups can be used to connect two or more structural elements containing a sulfonium group leading to dimeric, trimeric, oligomeric or polymeric structure. By doing so, the sulfonium equivalent weight remains more or less in a certain range, independent from the molecular weight and the viscosity of the initiator, taken into account that as a general rule the viscosity of the component usually increases with its molecular weight.

Thus, the quantity (e.g. in grams) of the inventive initiator needed for initiating a curing reaction of a cationically polymerizable composition will not vary too much independent from the structure and molecular mass of the initiator due to its comparable high content of sulfonium groups represented by a certain Eq value.

This is particularly valuable in the reformulation of certain curable compositions or other compositions where it is not possible to significantly vary the ratios of the reactants, especially the ratio of base paste to catalyst paste (e.g. a ration of 5:1 is needed for a curable composition to be mixed in a Pentamix™ mixing device available from 3M ESPE AG).

The initiators of the invention can be classified as derivatives of glutaric acid esters. In contrast to this, structural analogous mono-molecular, dimeric, oligomeric and/or polymeric derivatives from succinic acid esters were regarded as showing a too rapid curing behaviour, whereas analogous mono-molecular, dimeric, oligomeric and/or polymeric initiators derived from 2-methylene-succinic acid esters were regarded as showing a too slow curing behaviour.

Aziridine-group-containing compounds are preferred cationically polymerizable compounds. Particularly preferred aziridine-group-containing compounds include, e.g., N-alkyl aziridine polyether containing compounds. Such compounds comprise at least two ethylene imine groups, compounds having more than two ethylene imine groups are also useful.

Such components are known and described in the art, e.g., U.S. Pat. Nos. 3,453,242, 5,569,691, and U.S. Pat. No. 6,383, 279 B1. These documents, especially as regards their disclosure about aziridine-group-containing compounds is explicitly mentioned and herewith incorporated by reference.

Preferably, the aziridine groups are attached to an oligomeric and/or polymeric hydrocarbon, ester, ether or siloxane backbone. Such attached aziridine groups can be represented by the formula

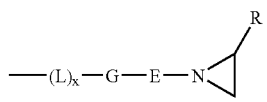

wherein
R represents H, $C_1$-$C_{12}$ alkyl, $C_2$-$C_{12}$ alkenyl, $C_2$-$C_{12}$ alkinyl, $C_7$-$C_{15}$ alkylaryl, $C_7$-$C_{15}$ arylalkyl or $C_3$-$C_{12}$ cycloalkyl, and wherein hydrogen atoms can be replaced by Cl or F and/or wherein up to about 5 carbon atoms may be replaced by atoms or group of atoms selected from O, CO, N or S, E represents a $C_1$-$C_{18}$ branched or unbranched hydrocarbon chain wherein up to about 5 carbon atoms can be replaced by atoms or group of atoms selected from O, CO, N or S, G represents a group selected from C(O)O, C(O)NR, C(O) or C(O)C(O), C(O)(CH$_2$)$_m$C(O), with m=1 to 10, C(S)NR or CH$_2$, L represents O, S or NR, with x=0 or 1.

If used as a dental impression material, the cationically polymerizable compound can be present in an amount in the range of about 35-90% by weight, or preferably about 40-75% by weight with respect to the weight of the cured composition.

If used as a dental duplicating material, the cationically polymerizable compound can be present in an amount in the range of about 10-25% by weight, or preferably about 12-20% by weight with respect to the weight of the cured composition.

The molecular weight ($M_n$) of the cationically polymerizable compound before curing is typically in the range of about 600-20,000 g/mol, and preferably about 1,000-10,0000 g/mol, as determined by GPC using appropriate techniques known in the art.

A useful method for determination of the molecular weight of organic polyols is a GPC method using a combination of PSS SDV 10.000 Å +PSS SDV 500 Å with column dimensions 8×300 mm and a particle size of 5 µm. In addition, a pre-column PSS SDV 100 Å with column dimensions 8×50 mm and a particle size of 10 µm is used. The eluent is THF stabilized with Jonol running with a flow rate of 1.0 ml/min. The detector is a refractive index detector (RI), the injection volume 100 µl. The samples have a concentration of 1% (solvent THF). Polystyrol standards are used.

In addition, the curable composition of the invention may comprise filler(s) as optional component (C) and also additive(s) as optional component (D).

A wide variety of inorganic, especially hydrophobic fillers may be employed such as silicas, aluminas, magnesias, titanias, inorganic salts, metallic oxides and glasses. It is also possible to employ mixtures of silicone dioxides, including those derived from crystalline silicone dioxide, such as pulverized quartz (4 to 6 µm); amorphous silicone dioxides, such as a diatomaceous earth (4 to 7 µm); and silanated fumed silica, such as Cab-o-Sil TS-530 (160-240 m$^2$/g), manufactured by Cabot Corporation. Varying the sizes and surface areas of the foregoing materials enables one to control the viscosity and thixotropicity of the uncured compositions as well as the physical properties of the cured compositions. Some or all of the foregoing hydrophobic fillers may be surface treated with one or more silanating agents, such as known to those of ordinary skill in the art. Such silanating may be accomplished, e.g., using known halogenated silanes or silazides. Some useful functionalized silicas are commercially available, e.g. products sold under the brands Aerosil™ (Degussa) or HDKH™ (Wacker).

Among the fillers which can be used are non-reinforcing fillers such as quartz, cristobalite, calcium silicate, diatomaceous earth, zirconium silicate, montmorillonite such as bentonite, zeolite, including molecular sieves such as sodium aluminium silicate, metal oxide powder such as aluminium or zinc oxide or their mixed oxides, barium sulphate, calcium carbonate, plaster, glass and plastic powder. The non-reinforcing fillers can be surface treated. The surface treatment can generally be carried out with the same methods as described for the reinforcing fillers.

Suitable fillers also include reinforcing fillers such as e.g. pyrogenic or precipitated silicic acid and silica aluminium mixed oxides. The above mentioned fillers can be hydrophobized, e.g. by treatment with organosilanes or siloxanes or by the etherification of hydroxyl groups to alkoxy groups. One type of filler or also a mixture of at least two fillers can be used. The particle distribution is preferably chosen such that there are no fillers with particle sizes of more than 50 µm.

A combination of reinforcing and non-reinforcing fillers can be desirable. In this respect, the quantity of reinforcing fillers in the composition may range from about 0.1-15 wt.-%, and in particular, from about 1-10 wt.-%. The difference in the named overall ranges, i.e. about 9 to about 80 wt.-%, can be accounted for by non-reinforcing fillers.

Because the filler is an optional component, it may not be present at all, but typically it will be present in the curable composition at an amount of from about 0-80 wt.-%, preferably about 5-70 wt.-%, or more preferably about 10-60 wt.-% based upon the weight of the total composition.

Besides filler(s), additives can be present like dyes, pigments, thixotropic agents, flow improvers, polymeric thickeners, surfactants, odorous substances, diluting agents and/or flavourings. All kinds of known and compatible softeners and rheology modifiers like non-reactive polymeric fluids or fats commonly used in commercialized impression materials can be added as well as pigments and stabilizers of any kind.

Preferred are those ingredients and additives that do not add unpleasant smell or taste. Compounds that have an unpleasant smell might be removed by thin film evaporation, if needed.

Examples of suitable thixotropic agent(s) that can be added to the curable composition of the invention include organic compounds, e.g., waxes according to the definition in Ullmanns Enzyklopädie der technischen Chemie, 4. Auflage, Verlag Chemie, Weinheim, Band 24, page 3, or triglycerides (as described in U.S. Pat. No. 6,127,449). In general, all organic, non-aqueous thixotropic agents can be suitable.

Some of the untreated or surface treated inorganic fillers mentioned above may also contribute to the rheological properties of the formulation. Fillers that contribute to the thixotropic rheological properties of the curable compositions may be selected from the group of inorganic fillers are modified or unmodified bentonite(s), kaoline(s) and the like.

Representative examples of surfactant(s) include, e.g., polyethers and polyether-type materials Such surfactants include, for example, those sold under the trademarks Pluronic™, Synperonic™, Silwet™ type materials. Especially useful are substances described in U.S. Pat. No. 5,569,691 A1 the disclosure of which (especially in regard to surfactants) is herewith incorporated by reference.

Generally, suitable diluting agent(s) are liquids. Preferred diluting agents do not contain moieties: —SH, —COOH, or primary or secondary amino groups, but they may contain —OH groups. Liquids such as $C_{12}$-$C_{15}$ alkyl acetates, liquid derivatives of citric acid, esters of phthalic acid with branched alcohols like bis(2-ethylhexyl)phthalate or polymeric phthalates, $C_2$-$C_{18}$ bis(alkyl)esters of $C_2$-$C_6$ dicarboxylic acids like dioctylmaleate, dioctyladipate, aromatic and aliphatic esters of sulfonic acids (like those sold under the trademark Mesamoll™), aromatic and aliphatic amides of sulfonic acids like N-ethyl toluene sulfonic acid amide or N-butyl benzene sulfonic acid amide. Typical aromatic diluters like polyphenyls, dibenzyl toluene, xylyl toluene, dixylyl toluene and polymeric compounds like polyethers, polyesters, polycarbonates, polyolefins also can be used. Also, low molecular weight alcohols that contain more than one OH-functionality, like propane-1,2, diol, may be used. From the group of polymeric compounds, polypropylene glycols and its derivatives are preferred.

Generally, the additive(s) can be present in amount of about 0-89 wt.-%, or preferably in amount of about 5-85 wt.-%, or most preferably in amount of about 10-80 wt.-% with respect to the weight of the cured composition.

If used as a dental impression material the additive(s) are typically used in an amount in the range of about 10-65%, or preferably in the range of about 25-60% with respect to the weight of the cured composition.

If used as a dental duplicating material the additive(s) typically can be present in the range of about 10-90 weight %, or preferably in the range of about 20-85% by weight with respect to the cured composition.

Thus, typical compositions for the curable composition of the invention comprise components (A) to (D) in the following amounts:

Component (A): about 10% to about 90 wt.-%

Component (B): about 1 wt.-% to about 15 wt.-%

Component (C): about 0 wt.-% to about 80 wt.-%

Component (D): about 0 wt.-% to about 89 wt.-%.

The curable composition, after curing, preferably satisfies at least one, and preferably two or more of the following characteristics:

Shore A hardness (DIN 53505, measured 24 hours after mixing) above about 10, or preferably above about 15. Values up to about 80, up to about 75 or up to about 70 can be reached.

Tensile strength (MPa) above about 0.2, or above about 0.3, or above about 0.4. Values up to about 6, up to about 5 or up to about 4 can be reached.

Elongation at break (%) above about 30, or above about 50, and or above about 80. Values up to about 300, up to about 250 or up to about 200 can be reached.

Tensile strength and Elongation at break are measured according to Deutsche Industrie Norm (DIN) or European Norm (EN) Method #53504 (geometry S2, 200 mm/min) using Universalprüfmaschine Zwick Z020 (Zwick GmbH &Co, Ulm, Germany).

For precision impression materials the values for linear dimensional change (ISO 4823: 2000) are within the limits according to ISO 4823:2000.

Consistency and recovery after deformation are within the limits of ISO 4823:2000. The curable compositions can be formulated to provide materials of various viscosities, from light body-type materials (Type 3) to putty materials (Type 0) according to ISO 4823:2000.

The invention also relates to a process for producing a curable composition comprising the steps of providing component (A) comprising a cationically curable compound as described above and component (B) comprising the inventive initiator as described above, mixing component (A) and component (B).

The other optional ingredients like filler(s) and additive(s) can be present either in component (A) or component (B) or in both components (A) and (B).

The typical volumetric mixing ratios of component (A) and component (B) for dental materials are in the range of about 0.5:1 to about 15:1, or preferably, in the range of about 1:1 to about 10:1. Especially preferred is a volumetric mixing ratio of about 5 to about 1.

Dosing of the components can be carried out by sight (strand-length comparison), by weight, via pre-dosed pack units and subsequent manual mixing, from double-chambered cartridges with static mixing tubes or by means of volume dosing systems with downstream static or dynamic mixers.

An especially useful device for mixing the components for dental applications is the device described in U.S. Pat. No. 5,286,105 and available on the market as the Pentamix™ machine or Pentamix™ 2 machine (from 3M ESPE AG). Mixing, however, can also be performed manually.

Often formulations are provided as two or multi-part system (such as a kit), in which two or more parts of the composition are stored separately and combined, e.g., by mixing, upon use.

According to the invention, the first part (i.e., part I or base paste) of a typical two-part system comprises the cationically curable compound and the second part (i.e., part II or catalyst paste) comprises the initiator. Both parts are stored separately from each other until they are mixed prior to use.

The invention also provides a use of the inventive initiators as described herein for initiating the cure of a cationically polymerizable substance (e.g., the cationically polymerizable compound).

The curable composition as described above can be used broadly for coating substrates, as sealing materials, moulding materials, for adhesively fixing substrates, making impressions, and/or for the modeling of objects or body parts.

The curable composition is especially useful for producing dental materials like precision impression materials, bite registration materials, duplicating materials, modeling materials, situation impression materials.

In this respect, the composition can be used e.g. for making impressions of soft and hard dental tissue. This can be achieved simply, e.g. filling the material into a dental tray and putting the tray into the mouth of a patient.

If used in the dental field, curing is preferably carried out at a temperature below about 50° C. and preferably below about 40° C., and more preferably below about 30° C. A typical time for cure of curable compositions of the invention used for dental impressioning is within about 20 min, or preferably within about 10 min, after mixing the components of the composition. For dental duplicating applications or dental modelling applications that take place in the professional dental laboratory, cure times of up to 45 min is generally acceptable. In other applications (e.g., sealing, moulding, coating, adhesively fixing), other cure times may be typical and higher cure temperatures may be acceptable. Nevertheless, setting times in the range of about 30 min or about 1 hour can still be useful.

The material is generally regarded as cured if the cured material fulfils the requirements for its use. For example, a dental precision impression material typically fulfils the requirements for its use when it fulfils the requirements of ISO 4823:2000 (such as compatibility with gypsum, strain in compression, recovery from deformation, detail reproduction, linear dimensional change).

Especially in the dental field two further parameters might be of some importance: working time and oral setting time.

According to DIN EN ISO 4823:2000 impression materials can be classified as Type 0 (kneadable), Type 1 (high viscosity), Type 2 (medium viscosity), and Type 3 (low viscosity).

The total working time at room temperature (23° C.) measured according to DIN EN ISO 4823:2000 for Impregum™ Garant L DuoSoft and Permadyn™ Garant L 2:1 (3M ESPE AG), both Type 3 regular setting polyether precision impression materials, is 3 min 40 s±15 s and 4 min±15 s, respectively.

The oral setting time is given by the manufacturer in the instructions for use. According to DIN EN ISO 4823:2000 the elastomeric property recovery from deformation of the vulcanized material have to reach values of ≧96.5% within the recommended oral setting time. In addition according to DIN EN ISO 4823:2000 the elastomeric property strain in compression of the vulcanized material has to come up to a value within the range of 0.8 to 20.0% for Type 0 and Type 1 materials and in the range of 2.0 to 20.0% for Type 2 and Type 3 materials, respectively within the recommended oral setting time.

If the composition is to be used as dental impression material, appropriate working times are in a range of about 20 s to about 7 min or about 30 s to about 6 min at room temperature (23° C.). For impression materials oral setting times should be as short as possible. Suitable oral setting times are ≦about 6 min or ≦about 5 min.

If used in the dental field, the composition can be applied using e.g. the following steps:

providing the components of the composition, mixing the components, applying the composition to a surface, letting the composition set.

The surface can be the surface of soft or hard oral tissue, the surface of an impression material, preferably of a cured impression material, the surface of a crown or the surface of a model of a tooth stump.

EXAMPLES

The invention is hereinafter described by examples. The examples are not intended to limit the scope of the invention.

Test Methods

Tensile Strength (MPa) and Elongation at Break (%)

Tensile strength and Elongation at break were measured according to Deutsche Industrie Norm (DIN) or European Norm (EN) Method #53504 (geometry S2, 200 mm/min) using Universalprüfmaschine Zwick Z020 (Zwick GmbH &Co, Ulm, Germany).

Shore A Hardness (After 24 Hours)

Shore A hardness was measured according to Deutsche Industrie Norm (DIN) Method #53505. The curable compositions were allowed to cure for 24 hours at 23° C. and ambient humidity before the hardness was measured.

Recovery After Deformation, Linear Dimensional Change (Shrinkage), Consistency were measured according to EN ISO 4823:2000.

Citric Acid Esters Employed in Catalyst Paste:

A acetyl tri-n-butyl citrate (CAS 77-90-7)

B acetyl tri-n-hexyl citrate (CAS 24817-92-3)

C acetyl tri-2-ethylhexyl citrate (CAS 144-15-0)

Initiators Employed:

See formulas for initiators 1 to 25 above.

Process for Producing Individual Initiator Compounds

Production Example 1

Initiator-3

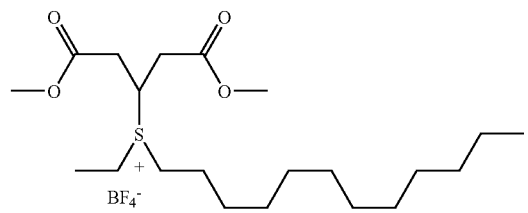

Step a): Under nitrogen atmosphere, 150 g cyclohexane and 2.25 g of a 30% solution of sodium methylate in methanol were placed in a four-necked round bottom flask. The mixture was stirred. Then 37.7 g dodecylthiol and 30.0 g dimethylglutaconate were added parallel via two dropping funnels within one hour. The reaction exothermed to 35° C. Stirring was continued for one more hour, after which an NMR spectrum showed that the reaction was complete. The mixture was diluted with 200 ml cyclohexane. It was then extracted twice with 250 ml 2N sulphuric acid and twice with 250 ml of water. The last extract showed a pH of 7. The solution was separated and filtered. After removing cyclohexane with a rotary evaporator, a slightly yellow liquid was obtained in 92% yield (61.9 g).

Step c): In a three-necked round bottom flask, 32.9 g triethyloxonium tetrafluoroborate and 50.0 g toluene were placed under nitrogen atmosphere. Under stirring at room temperature 50.0 g sulfide (from step a)) was added within six hours. The mixture was stirred vigorously for additional three days. A $^1$H-NMR spectrum showed that the reaction was complete. The mixture was diluted with 50 ml toluene. It was extracted six times with 200 ml water. The last water extract showed a pH of 3. 12.5 g of anhydrous sodium sulphate were added. After filtration and removing the solvent, a yellow liquid was obtained in 93% yield (61.3 g).

Production Example 2

Initiator-4

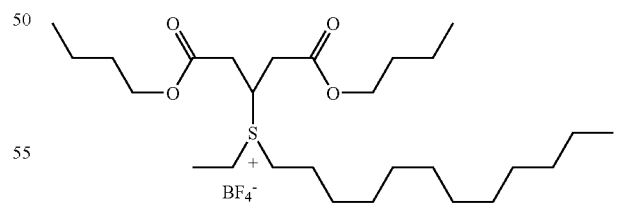

Step a): See above (step a) of Production Example 1)

Step b): 9.65 g of sulfide (from step a)), 20 ml of 1-butanol and 200 mg p-toluene sulfonic acid monohydrate were placed in a round bottom flask. The solution was heated to 100° C. under nitrogen atmosphere for 24 hours. Then about 10 ml of butanol/methanol mixture were distilled off. 15 ml butanol were added and the solution was again heated to 100° C. for 24 hours. A $^1$H-NMR-spectrum showed that the reaction was nearly complete. The solvent was removed completely in a high vacuum rotary evaporator. 40 ml cyclohexane and 8.3 g basic alumina were added. After shaking the slurry for 10 minutes and filtration, the solvent was removed again. 11.2 g of a clear, nearly colourless liquid were obtained (82% yield).

Step c): 21.4 g triethyloxonium tetrafluoroborate were put into a three-necked round bottom flask under nitrogen atmosphere. 45 ml toluene were added and the mixture was stirred. To the slurry, 40.0 g sulfide was added within two hours under stirring. Stirring was continued for additional four days at which time the reaction was nearly complete. 50 ml toluene were added and the solution was extracted six times with 80 ml water. The last extract showed a pH of 3. The solution was dried with 6 g anhydrous sodium sulfate and filtered. After removing the solvent 46.2 g (92%) of a yellow brownish liquid were obtained.

Production Example 3

Initiator-7

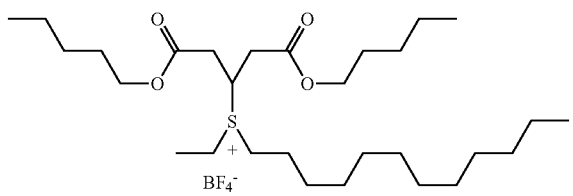

Step a): 2.22 g of a 30% solution of sodium methylate in methanol were filled into a three-necked round bottom flask. Under nitrogen atmosphere, 150 g cyclohexane was added. 30.0 g dimethylglutaconate and 36.5 g dodecylthiol were added parallel via two dropping funnels under stirring within one hour. During the addition, the temperature of the mixture rose to 30° C. After 30 minutes, a $^1$H-NMR-spectrum showed that the reaction was complete. The solution was diluted with 200 ml cyclohexane. It was extracted two times with portions of 200 ml 2 N sulphuric acid and two times with portions of 200 ml water. The last extract showed a pH of 7. After separation, the organic layer was filtered and the solvent was removed. A slightly yellow liquid was obtained in 93% yield (60.1 g).

Step b): 34.2 g sulfide (from step a)), 20.9 g 1-pentanol, 1.1 g p-toluene sulfonic acid monohydrate and 55.1 g toluene were filled into a three-necked round bottom flask. The solution was heated to reflux (111° C.) under nitrogen atmosphere and stirring. After thirty hours, the reaction was complete. Basic alumina (30.0 g) was added at room temperature. The slurry was stirred for one hour. After that the mixture was filtered. After removing the solvent, 43.2 g (96%) of a clear, slightly yellow liquid were obtained.

Step c): 20.83 g triethyloxonium tetrafluoroborate were filled into a three-necked round bottom flask. Under nitrogen atmosphere 43.2 g toluene were added. 43.2 g sulfide (from step b)) was added via dropping funnel under stirring at room temperature within 1.5 hours. After stirring for one week, the reaction was nearly complete. The solution was diluted with 40 ml toluene and extracted 6 times with 50 ml portions of water. The last extract showed a pH of 3. The organic layer was dried with sodium sulphate and filtrated. The solvent was removed in a vacuum rotary evaporator. 51.4 g (96%) of a clear, orange liquid were obtained.

Production Example 4

Initiator-8

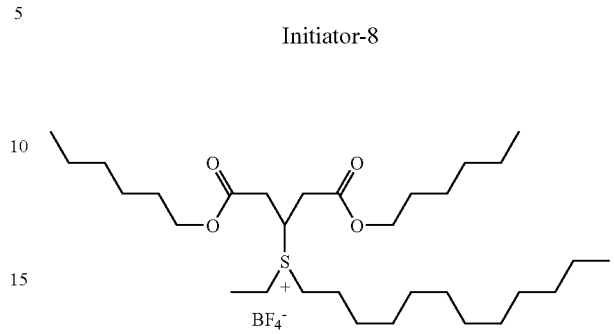

Step a): See step a) of Production Example 3
Step b): 50.0 g sulfide of step a), 35.9 g 1-hexanol and 850 mg p-toluene sulfonic acid monohydrate were filled into a three necked round bottom flask with stirrer and nitrogen inlet. The mixture was set under nitrogen atmosphere and heated to 100° C. for 1 week. The formed methanol was distilled off three times during the reaction. After one week a $^1$H-NMR-spectrum showed more than 96 mole percent hexylester. The mixture was diluted with 50 ml toluene and 40 g of basic alumina were added. After stirring for one hour, the slurry was filtered. The solvent was distilled off in a high vacuum rotary evaporator. 53.2 g of a yellow liquid were obtained (77% yield).

Step c): In a three-necked round bottom flask 25.2 g triethyloxonium tetrafluoroborate and 70 ml toluene were placed under nitrogen atmosphere. Under stirring at room temperature 53.2 g sulfide (of step b)) were added within five minutes. The mixture was stirred vigorously. After seven days the reaction was complete. The mixture was transferred into a separating funnel under addition of 50 ml toluene. It was extracted six times with 100 ml portions of water. The last water extract showed a pH of 3. After separation the solution was dried with 15 g anhydrous sodium sulphate. After filtration and removing the solvent a clear, yellow liquid was obtained. Yield was 60.1 g (92%).

Production of the other initiators used in Composition Examples 1 to 16 in Table 1 below can be accomplished in a similar way.

Composition Examples 1-16

Composition Examples 1-16 describe impression materials with a medium bodied consistency employing the sulfonium compounds described in Examples 1-XX as initiators of cationic ring-opening polymerization.

Catalyst Paste: Initiator was employed in the amount of 5.008 $10^{-2}$ mole per 100 g catalyst paste (19.30% to 46.40% by weight). The combined amount of initiator and citric acid ester was always 59.80% by weight. This resulted in 13.40% by weight to 40.50% by weight for citric acid ester. Thus, the higher the molecular weight of the initiator, the lower the amount of citric acid ester. Other components of the catalyst paste (comprising a total of 31.20% by weight) were: 3.50% by weight surfactant (copolymer EO (ethylene oxide)/PO (propylene oxide)), 24.10% by weight highly dispersed surface treated silica (HDKH™ (Wacker).), 12.10% by weight diatomaceous earth and 0.50% by weight pigments. Citric acid ester was used to first dissolve the initiator. Then the remaining components were added and mixed.

Base paste: 53.50% by weight difunctional aziridino polyether (EO (ethylene oxide)/THF (tetrahydrofuran) polyether back bone; $M_n$ 6000) with a low content of cyclic polyether compounds as described in U.S. Pat. No. 6,383,279 A1, 15.10% by weight fat (trisacylic ester of glycerine), 7.76% by weight dibenzyl toluene, 14.70% by weight polymeric polyether softener (EO (ethylene oxide)/THF (tetrahydrofuran) polyether backbone; $M_n$ 6000), 6.50% by weight diatomeceous earth, 0.54 imidazole compound and 1.90 weight % pigments, flavourings and fragrances.

The dental impression material was prepared by mixing 1.00 g of base paste with 0.24 g of catalyst paste using a spatula. The resulting mass was allowed to cure at room temperature for 24 hours before the Shore A hardness was measured.

A summary showing the initiator used and the type of citric acid ester employed, as well as the Shore A hardness of the resulting medium-bodied impression material is presented in Table 1. The characterization of the initiators as I-1 to I-25 in Table 1 corresponds to the characterization of the initiators listed above.

Comparative Example 1

Initiator Example 41 in U.S. Pat. No.4,167,618

TABLE 1

| Example | Initiator | Citric acid ester used in cat. paste | Shore A hardness |
|---|---|---|---|
| 1 | I-1 | B | 46 |
| 2 | I-2 | B | 45 |
| 3 | I-3 | A | 46 |
| 4 | I-3 | B | 45 |
| 5 | I-4 | B | 45 |
| 6 | I-5 | B | 45 |
| 7 | I-6 | B | 47 |
| 8 | I-7 | B | 45 |
| 9 | I-8 | B | 46 |
| 10 | I-9 | B | 46 |
| 11 | I-9 | C | 45 |
| 12 | I-10 | B | 47 |
| 13 | I-11 | B | 46 |
| 14 | I-16 | B | 47 |
| 15 | I-18 | A | 43 |
| 16 | I-25 | A | 44 |
| Comp. Ex 1 | Current | A | 46 |

Composition Examples 17-26

Sulfonium compounds were compounded into catalysts pastes as above and mixed with base pastes to form dental impression materials. In Examples 17-26, the impression materials were also medium-bodied consistency as in Examples 1-16. The systems differ, however, in the Examples 17-26, wherein a higher amount of difunctional aziridino polyether was used.

The catalyst pastes were the same as employed for Examples 1-16.

The base paste for Examples 17-26 comprised: 58.00% difunctional aziridino polyether (EO (ethylene oxide)/THF (tetrahydrofuran) polyether back bone; Mn 6000) with a low content of cyclic polyether compounds as described in U.S. Pat. No. 6,383,279 A1, 13.60% fat (trisacylic ester of glycerine), 0.88% surfactant (copolymer EO (ethylene oxide)/PO (propylene oxide)), 11.60% dibenzyl toluene, 13.90% diatomaceous earth, 0.65 imidazole compound and 1.37% pigments, flavourings and fragrances.

1.00 g of base paste was mixed with 0.24 g catalyst paste using a spatula. The resulting impression material was allowed to cure at room temperature for 24 hours before measurements were made according to the methods described above under TEST METHODS.

Comparative Example 2

Initiator Example 41 in U.S. Pat. No. 4,167,618

TABLE 2

| Example | Initiator | Citric acid ester type (cat. Paste) | Shrinkage (%) | Consistency (mm) | Recovery (%) | Tensile Strength (MPa) | Elongation at break (%) |
|---|---|---|---|---|---|---|---|
| 17 | I-3 | B | −0.24 | 35.5 | 98.20 | 2.32 ± 0.17 | 258 ± 38 |
| 18 | I-4 | B | −0.20 | 36.0 | 98.34 | 2.47 ± 0.12 | 258 ± 21 |
| 19 | I-5 | B | −0.19 | 36.0 | 98.12 | 2.52 ± 0.13 | 291 ± 29 |
| 20 | I-7 | B | −0.17 | 35.5 | 98.17 | 2.42 ± 0.15 | 272 ± 33 |
| 21 | I-8 | B | −0.19 | 35.5 | 98.10 | 2.36 ± 0.10 | 259 ± 21 |
| 22 | I-17 | A | −0.13 | n.d. | n.d. | n.d. | n.d. |
| 23 | I-20 | A | −0.22 | n.d. | n.d. | n.d. | n.d. |
| 24 | I-23 | A | −0.22 | n.d. | n.d. | n.d. | n.d. |
| 25 | I-24 | A | −0.08 | n.d. | n.d. | n.d. | n.d. |
| 26 | I-25 | A | −0.14 | n.d. | n.d. | n.d. | n.d. |
| Comp. Example 2 | Current | A | −0.44 | 36.5 | 98.40 | 2.46 ± 0.11 | 272 ± 27 | n.d. = not determined

The invention claimed is:

1. An initiator comprising at least one structural element characterized by the following formula:

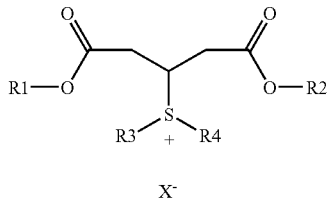

wherein

X⁻ is a non or low coordinating anion, R1, R2, R3, R4 are each independently selected from the group consisting of linear, cyclic or branched $C_1$-$C_{20}$ alkyl or alkylene groups, wherein one or more of the methylene groups contained in the alkyl or alkylene group can be substituted by —CO—, —CONH—, —CON(CH₃)—, —S— and/or —O—, and wherein R1, R2, R3 and/or R4 can act as a bridging element connecting two or more structural elements, 2. The initiator according to claim 1 having a molecular weight in the range of about 250 to about 25,000 g/mol, wherein the molecular weight is expressed by MW for monomers and Mn (number average molecular weight) for oligomers and/or polymers.

3. The initiator according to claim 1 with a sulfonium equivalent weight Eq in the range of about 300 to about 800 g/mol, wherein Eq is determined as molecular mass of the initiator divided by number of sulfonium groups present in the initiator.

4. The initiator according to claim 1, wherein X⁻ is selected from the group consisting of $BF_4^-$, $CF_3SO_3^-$, $SbF_6^-$, $AsF_6^-$ or 2,5-di-chloro-benzolsulfonate.

5. The initiator according to claim 1, wherein

R1 and R2 are each independently from the group consisting of methyl, ethyl, n-propyl, 2-propyl, n-butyl, sec-butyl, tert-butyl, n-pentyl, n-hexyl, n-heptyl or n-octyl and wherein one or more methylene groups of R1 and R2 can be substituted by —CO—, —CONH—, —CON(CH₃)—, —S— and/or —O—, R3 is methyl, ethyl, n-propyl, 2-propyl, n-butyl, sec-butyl, tert-butyl, n-pentyl, n-hexyl, n-heptyl or n-octyl, R4 is R3, n-nonyl, n-decyl, n-undecyl or n-dodecyl, wherein one or more of the methylene groups of this alkyl chain can be substituted by —CO—, —CONH—, —CON(CH₃)—, —S— and/or —O—.

6. A curable composition comprising:
(A) at least one cationic polymerizable compound as component (A),
(B) at least one initiator as described in claim 1 as component (B),
(C) optionally a filler as component (C), and
(D) optionally other additives as component (D).

7. The curable composition according to claim 6, wherein the cationic polymerizable compound contains aziridine groups.

8. The curable composition according to claim 7, wherein components (A) to (D) are contained in the following amounts:
Component (A): about 10 wt.-% to about 90 wt.-%
Component (B): about 1 wt.-% to about 30 wt.-%
Component (C): about 0 wt.-% to about 80 wt.-%
Component (D): about 0 wt.-% to about 89 wt.-%.

9. The curable composition according to claim 8 having at least one of the following properties:
A shore A hardness (DIN 53505, measured 24 h after mixing) above about 40 to 80;
A tensile strength according to DIN EN 53504, (MPa) above about 0.4; and/or
An elongation at break according to DIN EN 53504 (%) above about 50.

10. A process of producing a curable composition, the process comprising the steps of:
providing at least one cationic polymerizable compound as component (A), and at
least one initiator as described in claim 1 as component (B), mixing components (A) and (B), 11. A method of curing a cationically polymerizable substance, comprising the step of adding an initiator as described in claim 1 to start the curing process of a cationic polymerizable substance.

12. The curable composition of claim 7, wherein the composition is a coating, sealing, moulding, adhering, or material impression.

13. The curable composition of claim 7, wherein the composition is a dental material selected from the group consisting of precision impression materials, situation impression materials, bite registration materials, duplicating materials, and modelling materials.

* * * * *

UNITED STATES PATENT AND TRADEMARK OFFICE
CERTIFICATE OF CORRECTION

| | |
|---|---|
| PATENT NO. | : 7,947,757 B2 |
| APPLICATION NO. | : 11/997192 |
| DATED | : May 24, 2011 |
| INVENTOR(S) | : Thomas Klettke et al. |

It is certified that error appears in the above-identified patent and that said Letters Patent is hereby corrected as shown below:

Column 1
Line 10                 Delete "No.05016531.5," and insert -- No. 016531.5, --, therefor.

Column 3
Line 48                 Delete "ore" and insert -- or --, therefor.
Lines 52-53             Delete "isooclylester" and insert -- isoocylester --, therefor.

Column 4
Line 13                 After "reactions" insert -- . --.
Line 19                 After ")" insert -- . --.

Column 12
Lines 24-30             Delete "is reacted....not mandatory." and insert the same on Col. 12, Line 23, after "butyl" as a continuation of the paragraph.

Column 14
Line 65                 Delete "alkinyl," and insert -- alkenyl, --, therefor.

Column 17
Line 37                 Delete "and or" and insert -- and/or --, therefor.

Column 23
Lines 9-10              Delete "diatomeceous" and insert -- diatomaceous --, therefor.
Line 26 (Approx)        Delete "No.4,167,618" and insert -- No. 4,167,618 --, therefor.

Column 25
Line 24                 In Claim 1, delete "elements," and insert -- elements. --, therefor.

Signed and Sealed this
Eleventh Day of October, 2011

David J. Kappos
*Director of the United States Patent and Trademark Office*

Column 26
Lines 30-33

In Claim 10, delete "providing at least one cationic polymerizable compound as component (A), and at least one initiator as described in claim 1 as component (B), mixing components (A) and (B)," and insert -- providing at least one cationic polymerizable compound as component (A), and at least one initiator as described in claim 1 as component (B), mixing components (A) and (B). --, therefor.